Dec. 13, 1932.  W. H. WATLINGTON  1,891,128
WINDSHIELD FOR VEHICLES
Filed June 24, 1931
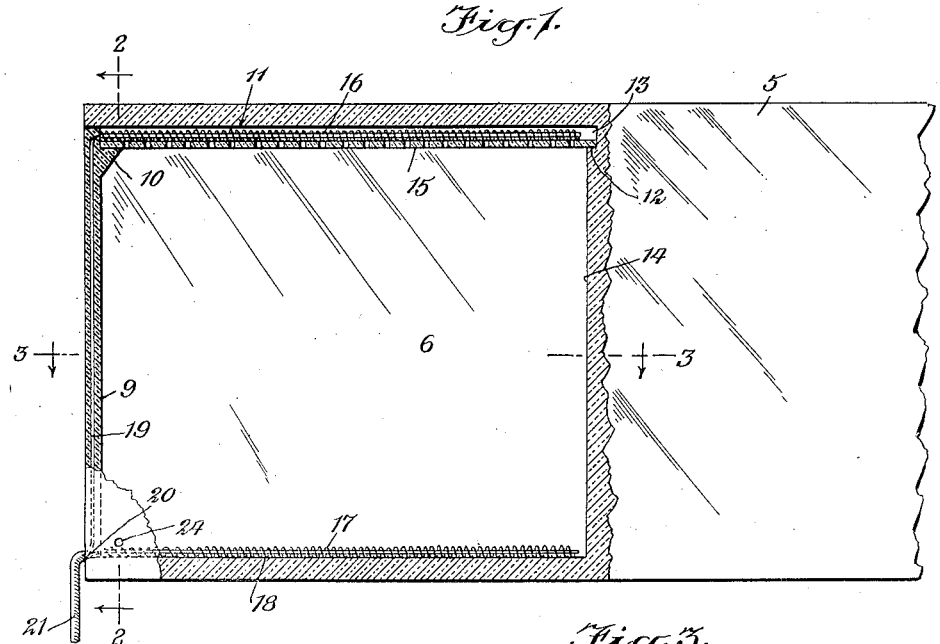
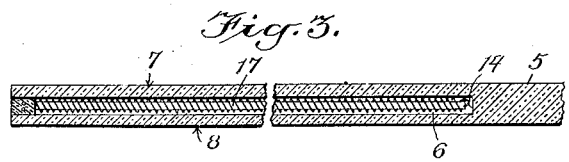
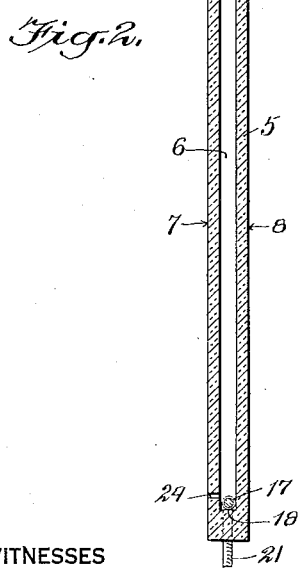
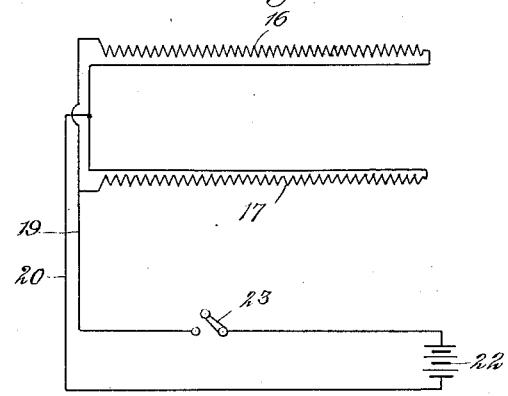
WITNESSES
INVENTOR
W. H. Watlington
BY
ATTORNEYS Patented Dec. 13, 1932

1,891,128

UNITED STATES PATENT OFFICE

WILLIAM H. WATLINGTON, OF DENVER, COLORADO

WINDSHIELD FOR VEHICLES

Application filed June 24, 1931. Serial No. 546,597.

This invention relates to windshields for vehicles and comprehends a windshield which is constructed and equipped with suitable means for heating a predetermined area thereof so as to prevent the formation of ice on the surface which acts to obscure the driver's vision.

The present invention aims to provide a windshield formed with a chamber or air space intermediate its outer and inner surfaces, together with means located within said space for raising the temperature to the proper degree for preventing the freezing of moisture on the outer surface.

As a further object the invention resides in the provision of a windshield of the character set forth which is comparatively simple in its construction, inexpensive to produce, and which is highly efficient in its purpose.

With the above recited and other objects in view, reference is had to the following specification and the accompanying drawing, in which there is illustrated one form of the invention, while the claims define the actual scope thereof.

In the drawing:

Figure 1 is a fragmentary rear view of a windshield panel constructed in accordance with the invention, parts being broken away and shown in section to disclose the underlying structure.

Figure 2 is an enlarged vertical transverse sectional view therethrough taken approximately on the line indicated at 2—2 in Figure 1.

Figure 3 is a horizontal sectional view therethrough taken approximately on the line indicated at 3—3 in Figure 1.

Figure 4 is a diagrammatic view of the wiring circuit.

Referring to the drawing and characters of reference, 5 designates the windshield panel which in the present instance is illustrated as constructed of a single piece of plate glass having a chamber 6 formed therein between its upper and lower edges and extending through one side edge although within the scope of the invention, it is to be understood that the chamber 6 may be otherwise formed to provide an air space between the forward and rear surfaces 7 and 8 of the windshield panel. The open side of the chamber 6 is closed by wall 9 which in the present instance is in the nature of a strip of insulating material properly secured in place and which is provided adjacent its upper end with an inwardly projecting lug 10, the upper surface of which is spaced from the upper wall 11 of the chamber 6 a distance equal to the lower wall 12 of a notch 13 provided in the inner side wall 14 of the chamber. An apertured strip of insulating material 15 is supported at its opposite ends by the upper surface of the lug 10 and the lower wall 12 of the notch 13. Suitable resistance heating elements 16 and 17 are supported respectively by the strip 15 and the lower wall 18 of the chamber 6, and conductors 19 and 20 lead from the heat resistance elements 16 and 17 through the end wall or strip 9 through a conduit 21 to the opposite poles of a battery or source of supply 22, a controlling switch 23 being installed in one of the conductors for opening or closing the circuit to de-energize or energize the heating elements 16 and 17.

In order to compensate for the expansion and contraction of the air within the chamber 6, a vent 24 is formed in the windshield panel 5 at the point indicated, or at any other suitable place where it will probably admit of the ingress or egress of air to the chamber.

While there has been illustrated and described a preferred embodiment of the invention, no alteration is necessarily intended to the precise structural details herewith exhibited, as it is to be understood that variations and modifications which fall within the scope of the claims may be resorted to when desired.

What is claimed is:

1. A windshield for vehicles including a transparent panel having a hollow portion extending inwardly from one side between its front and rear surfaces and its upper and lower edges, a closure element closing the open side of said hollow portion to define a closed chamber and means within said chamber for heating the surrounding area of said panel to a temperature for preventing the formation of ice on the surface thereof, the inner vertical side wall of the chamber having a notch adjacent its upper end, the lower edge of which notch is spaced from the upper wall of the chamber and a lug projecting inwardly into the chamber from the closure element and presenting an upper surface spaced from the upper wall of the chamber, said lower edge of the notch and upper surface of the lug of the closure element supporting the chamber heating means.

2. A windshield for vehicles including a transparent panel having a recess opening through one edge and lying wholly within the remaining edges and surfaces, a closure element disposed within the portion of the recess which opens through said panel edge, to close the recess and define a heating chamber within the confines of the panel and electric resistance heating means within the recess supported in part by said closure element, said closure element being formed of an insulating material and having a passage for accommodating conductors leading to and from said heating element.

WILLIAM H. WATLINGTON.